United States Patent
Polidi et al.

(10) Patent No.: US 6,591,185 B1
(45) Date of Patent: Jul. 8, 2003

(54) METHOD FOR DETERMINATION OF FUEL USAGE FOR A VEHICLE IN A VEHICLE NAVIGATION SYSTEM

(75) Inventors: Ari Israel Polidi, Mountain View, CA (US); Naveen K. Madapati, Sunnyvale, CA (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/074,308

(22) Filed: Feb. 11, 2002

(51) Int. Cl.[7] .............................................. G01C 21/32
(52) U.S. Cl. ................... 701/201; 701/209; 701/35; 701/25; 140/991; 140/993; 140/428; 140/450.2; 180/69.4; 342/357.06
(58) Field of Search ............................... 701/201, 200, 701/35, 36, 25, 203, 209, 211, 202, 26, 210; 340/995, 988, 990, 991, 993, 428, 450.2, 870.16; 73/113; 180/69.4, 69.5; 455/456; 705/22; 342/357.06

(56) References Cited

U.S. PATENT DOCUMENTS

| | | | | |
|---|---|---|---|---|
| 4,400,779 A | | 8/1983 | Kosuge et al. ................. 73/114 |
| 4,564,905 A | * | 1/1986 | Masuda et al. ................ 73/114 |
| 5,568,390 A | | 10/1996 | Hirota et al. ................. 340/990 |
| 5,608,635 A | * | 3/1997 | Tamai .......................... 340/990 |
| 5,790,973 A | | 8/1998 | Blaker et al. ................ 701/123 |
| 5,821,880 A | * | 10/1998 | Morimoto et al. ........... 340/995 |
| 5,913,917 A | * | 6/1999 | Murphy ....................... 701/123 |
| 6,005,494 A | | 12/1999 | Schramm .................... 340/995 |
| 6,064,941 A | * | 5/2000 | Nimura et al. .............. 701/210 |
| 6,424,893 B1 | * | 7/2002 | Byrne et al. .................. 701/35 |

* cited by examiner

Primary Examiner—Thomas G. Black
Assistant Examiner—Tuan C To
(74) Attorney, Agent, or Firm—MacMillan, Sobanski & Todd, LLC

(57) ABSTRACT

A method for determining optimal fuel usage in a vehicle navigation system and a warning system for alerting a driver when there is insufficient fuel to reach a desired destination. In addition, provision is made to calculate fuel usage and to alert the driver when there is insufficient fuel to reach a fuel filling station on a return trip from the desired destination.

19 Claims, 1 Drawing Sheet

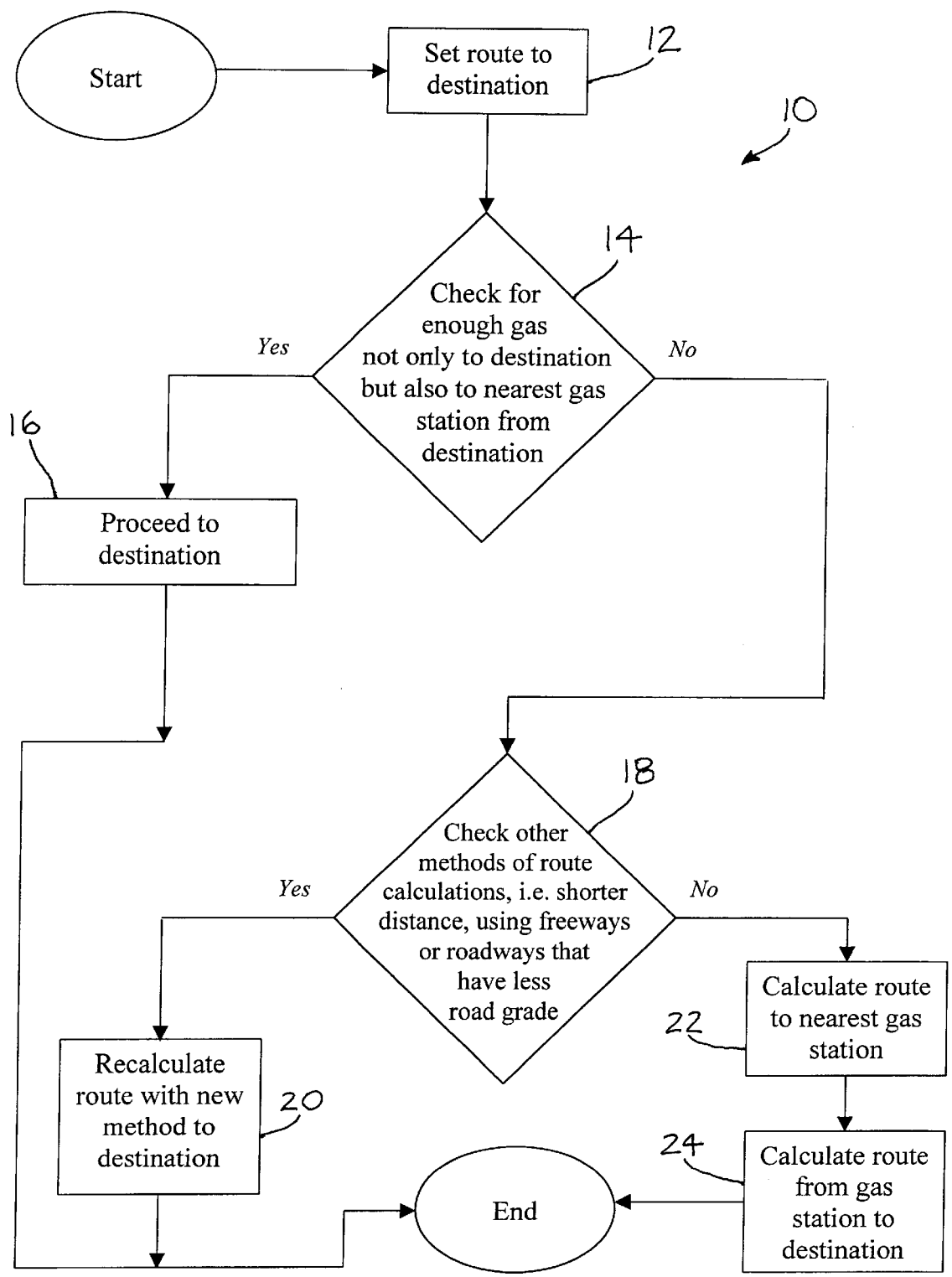

METHOD FOR DETERMINATION OF FUEL USAGE FOR A VEHICLE IN A VEHICLE NAVIGATION SYSTEM

FIELD OF THE INVENTION

The invention relates to a navigation system for a vehicle and more particularly to a navigation system including a method for determining fuel usage to reach a desired destination and a fuel filling station nearest the destination.

BACKGROUND OF THE INVENTION

A navigation system for a vehicle has become increasingly popular as an accessory in the vehicle. The navigation system assists a driver by locating destinations, providing information regarding fuel efficiency, and providing other useful information.

Certain navigation systems, such as that disclosed in U.S. Pat. No. 5,742,922, calculate a route to a destination according to fuel consumption. The navigation system disclosed in the '922 patent permits alternate routes to be selected based upon calculated fuel efficiency.

It would be desirable to produce a navigation system for a vehicle which calculates an expected fuel consumption to a destination, as well as from the destination to the nearest fuel filling station to assist a driver in planning for fuel stops as needed and avoid running out of fuel.

SUMMARY OF THE INVENTION

Consistent and consonant with the present invention, a navigation system for a vehicle which includes a method for calculating an expected fuel consumption to a destination, as well as from the destination to the nearest fuel filling station has surprisingly been discovered. The method for determining fuel usage for a vehicle in a vehicle navigation system comprises the steps of: entering a destination in the vehicle navigation system; calculating a first route to reach the destination; calculating approximate fuel usage required for the vehicle to reach the destination by the first route and to reach a fuel filling station closest to the destination; comparing the calculated fuel usage required for the vehicle to reach the destination by the first route with a quantity of fuel remaining in the vehicle; and displaying a message that the destination and the fuel filling station closest to the destination cannot be reached when the fuel remaining is less than the calculated fuel usage required for the vehicle to reach the destination by the first route and the fuel filling station closest to the destination.

BRIEF DESCRIPTION OF THE DRAWING

The above, as well as other objects, features, and advantages of the present invention will be understood from the detailed description of the preferred embodiments of the present invention with reference to the accompanying drawing, in which:

FIG. 1 is a flow diagram illustrating a method incorporating the features of the invention.

DETAILED DESCRIPTION OF THE PREFERRED EMBODIMENTS

Referring now to the drawing, there is shown generally at 10 a flow diagram illustrating the features of the invention. The flow diagram 10 includes the first step of setting a route to a destination 12. A driver inputs information to a navigation system using a keypad (not shown), a touch screen (not shown), or other input device which identifies the destination in a format readable by the navigation system.

Once the destination is entered, the navigation system selects a route to the destination and calculates whether there is enough fuel to reach the destination and to reach the nearest fuel filling station from the destination 14. A signal is received from the fuel gauge by the navigation system indicating the amount of fuel left in the vehicle fuel storage tank. Using the destination information input by the driver, distance information from a current position, and fuel efficiency data obtained from a vehicle central computer, the navigation system is able to calculate whether there is sufficient fuel to reach the destination through a selected route and reach the nearest fuel filling station from the destination 14. The current position of the vehicle is obtained using global positioning system (GPS) satellite information received by the navigation system. Additionally, the distance information is either calculated using database information from a storage device such as a compact disk in the vehicle or a central database remote from the vehicle and transmitted to the navigation system.

If the navigation system determines there is sufficient fuel to reach the destination, and the nearest fuel filling station from the destination 14, the driver can proceed to the destination 16. If desired, a message is displayed by the navigation system for the driver indicating that there is sufficient fuel.

In the event there is insufficient fuel to reach the destination using the selected route and reach the nearest fuel filling station from the destination 14, the navigation system checks whether there is sufficient fuel to reach the destination and the nearest fuel filling station from the destination through other possible routes 18. The navigation system checks routes having shorter route distances, routes using more freeways or primary roads than secondary roads, routes having less grade change, or other fuel saving features. If there are other possible routes having shorter route distances or having less of a road grade to allow the driver to reach the destination-and the nearest fuel filling station, the navigation system selects a second selected route and recalculates and displays the second route information 20 for the driver. If there are no other possible routes having shorter route distances or having less of a road grade to allow the driver to reach the destination and the nearest fuel filling station, the navigation system calculates and displays a route to the closest fuel filling station 22 for the driver.

Once the route to the closest fuel filling station 22 is calculated and displayed, the navigation system calculates and displays the route from the nearest fuel filling station to the destination 24.

Some advantages are experienced by using the navigation system incorporating the features of the invention. One advantage is assisting the driver in driving in a manner that improves fuel efficiency. Another advantage is assisting a driver in deciding when a fuel refilling stop is necessary.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for determining fuel usage for a vehicle in a vehicle navigation system comprising the steps of entering a destination in the vehicle navigation system;

calculating a first route to reach the destination;

identifying a fuel filling station closest to the destination;

calculating approximate fuel usage required for the vehicle to reach the destination by the first route plus fuel usage to reach the fuel filling station closest to the destination after reaching the destination;

comparing the calculated fuel usage required for the vehicle to reach the destination by the first route plus fuel usage to reach the fuel filling station closest to the destination after reaching the destination with a quantity of fuel remaining in the vehicle; and displaying a message that the destination and the fuel filling station closest to the destination cannot be reached when the fuel remaining is less than said calculated fuel usage required for the vehicle to reach the destination by the first route plus fuel usage to reach the fuel filling station closest to the destination after reaching the destination.

2. The method of claim 1 including the step of calculating at least one alternate route to save fuel to reach the destination.

3. The method of claim 2 wherein said at least one calculated alternate route is calculated only if the fuel remaining is less than said calculated fuel usage required for the vehicle to reach the destination by the first route plus fuel usage to reach the fuel filling station closest to the destination after reaching the destination.

4. The method of claim 2 including the step of calculating said at least one calculated alternate route based upon at least one of determining a shorter distance to reach the destination, choosing a roadway having less grade change than the first route, and choosing a route having more primary roads than the first route.

5. The method of claim 2 including the step of selecting a second route from the at least one alternate route.

6. The method of claim 5 including the step of calculating approximate fuel usage required for the vehicle to reach the destination by the second route plus fuel usage to reach the fuel filling station closest to the destination after reaching the destination.

7. The method of claim 6 including the step of calculating a route to a fuel filling station nearest a current position of the vehicle if the fuel remaining is less than said calculated fuel usage required for the vehicle to reach the destination by the second route plus fuel usage to reach the fuel filling station closest to the destination after reaching the destination.

8. The method of claim 7 including the step of calculating a route from the fuel filling station nearest the current position of the vehicle to the destination.

9. The method of claim 1 including the step of calculating a route to a nearest fuel filling station if the fuel remaining is less than said calculated fuel usage required for the vehicle to reach the destination by the first route plus fuel usage to reach the fuel filling station closest to the destination after reaching the destination.

10. The method of claim 1 including the step of displaying a message that the destination can be reached when the fuel remaining is more than said calculated fuel usage required for the vehicle to reach the destination by the first route plus fuel usage to reach the fuel filling station closest to the destination after reaching the destination.

11. A method for determining fuel usage for a vehicle in a vehicle navigation system comprising the steps of:

entering a destination in the vehicle navigation system;

calculating a first route to reach the destination;

identifying a fuel filling station closest to the destination;

calculating approximate fuel usage required for the vehicle to reach the destination by the first route and then to reach the fuel filling station closest to the destination;

comparing the calculated fuel usage required for the vehicle to reach the destination by the first route plus fuel usage to reach the fuel filling station closest to the destination after reaching the destination with a quantity of fuel remaining in the vehicle;

displaying a message that the destination and the fuel filling station closest to the destination cannot be reached when the fuel remaining is less than said calculated fuel usage required for the vehicle to reach the destination by the first route and the fuel filling station closest to the destination; and displaying a message that the destination can be reached when the fuel remaining is more than said calculated fuel usage required for the vehicle to reach the destination by the first route plus fuel usage to reach the fuel filling station closest to the destination after reaching the destination.

12. The method of claim 11 including the step of calculating at least one alternate route to save fuel to reach the destination plus fuel usage to reach the fuel filling station closest to the destination after reaching the destination.

13. The method of claim 12 wherein said at least one calculated alternate route is calculated only if the fuel remaining is less than said calculated fuel usage required for the vehicle to reach the destination by the first route plus fuel usage to reach the fuel filling station closest to the destination after reaching the destination.

14. The method of claim 12 including the step of selecting a second route from the at least one alternate route.

15. The method of claim 14 including the step of calculating approximate fuel usage required for the vehicle to reach the destination by the second route plus fuel usage to reach the fuel filling station closest to the destination after reaching the destination.

16. The method of claim 15 including the step of calculating a route to a fuel filling station nearest a current position of the vehicle if the fuel remaining is less than said calculated fuel usage required for the vehicle to reach the destination by the second route plus fuel usage to reach the fuel filling station closest to the destination after reaching the destination.

17. The method of claim 16 including the step of calculating a route from the fuel filling station nearest the current position of the vehicle to the destination.

18. The method of claim 11 including the step of calculating a route to a nearest fuel filling station if the fuel remaining is less than said calculated fuel usage required for the vehicle to reach the destination by the first route plus fuel usage to reach the fuel filling station closest to the destination after reaching the destination.

19. A method for determining fuel usage for a vehicle in a vehicle navigation system comprising the steps of:

entering a destination in the vehicle navigation system;

calculating a first route to reach the destination;

identifying a fuel filling station closest to the destination;

calculating approximate fuel usage required for the vehicle to reach the destination by the first route plus fuel usage to reach the fuel filling station closest to the destination after reaching the destination;

comparing the calculated fuel usage required for the vehicle to reach the destination by the first route plus fuel usage to reach the fuel filling station closest to the destination after reaching the destination with a quantity of fuel remaining in the vehicle;

displaying a message that the destination and the fuel filling station closest to the destination cannot be reached when the fuel remaining is less than said calculated fuel usage required for the vehicle to reach the destination by the first route plus fuel usage to reach the fuel filling station closest to the destination after reaching the destination;

displaying a message that the destination can be reached when the fuel remaining is more than said calculated fuel usage required for the vehicle to reach the destination by the first route plus fuel usage to reach the fuel filling station closest to the destination after reaching the destination;

calculating at least one alternate route to save fuel to reach the destination if the fuel remaining is less than said calculated fuel usage required for the vehicle to reach the destination by the first route plus fuel usage to reach the fuel filling station closest to the destination after reaching the destination;

selecting a second route from the at least one alternate route if the fuel remaining is less than said calculated fuel usage required for the vehicle to reach the destination by the first route plus fuel usage to reach the fuel filling station closest to the destination after reaching the destination;

calculating approximate fuel usage required for the vehicle to reach the destination by the second route plus fuel usage to reach the fuel filling station closest to the destination after reaching the destination if the fuel remaining is less than said calculated fuel usage required for the vehicle to reach the destination by the first route plus fuel usage to reach the fuel filling station closest to the destination after reaching the destination;

comparing the calculated fuel usage required for the vehicle to reach the destination by the second route plus fuel usage to reach the fuel filling station closest to the destination after reaching the destination with a quantity of fuel remaining in the vehicle calculating a route to a fuel filling station nearest a current position of the vehicle if the fuel remaining is less than said calculated fuel usage required for the vehicle to reach the destination by the second route plus fuel usage to reach the fuel filling station closest to the destination after reaching the destination;

calculating a route from the fuel filling station nearest the current position of the vehicle to the destination if the fuel remaining is less than said calculated fuel usage required for the vehicle to reach the destination by the second route plus fuel usage to reach the fuel filling station closest to the destination after reaching the destination; and displaying at least one of the first route, the second route, the route to a fuel filling station nearest a current position of the vehicle, and a route from the destination to the fuel filling station closest to the destination.

* * * * *